United States Patent
Nikaido et al.

(10) Patent No.: US 9,619,154 B2
(45) Date of Patent: Apr. 11, 2017

(54) COMPUTER SYSTEM, DATA MANAGEMENT METHOD, AND HOST COMPUTER

(71) Applicant: Hitachi, Ltd., Tokyo (JP)

(72) Inventors: Yuki Nikaido, Tokyo (JP); Masaaki Hosouchi, Tokyo (JP); Taiki Miyaji, Tokyo (JP); Takashi Nagao, Tokyo (JP); Takeyuki Imadu, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 59 days.

(21) Appl. No.: 14/428,003

(22) PCT Filed: Jan. 18, 2013

(86) PCT No.: PCT/JP2013/050960
§ 371 (c)(1),
(2) Date: Mar. 13, 2015

(87) PCT Pub. No.: WO2014/112104
PCT Pub. Date: Jul. 24, 2014

(65) Prior Publication Data
US 2015/0253991 A1    Sep. 10, 2015

(51) Int. Cl.
*G06F 3/00* (2006.01)
*G06F 3/06* (2006.01)

(52) U.S. Cl.
CPC ............ *G06F 3/061* (2013.01); *G06F 3/0631* (2013.01); *G06F 3/0659* (2013.01);
(Continued)

(58) Field of Classification Search
CPC ..... G06G 3/061; G06F 3/0631; G06F 3/0665; G06F 3/0685; G06F 3/0689; G06F 3/0659
(Continued)

(56) References Cited

U.S. PATENT DOCUMENTS

| | | | |
|---|---|---|---|
| 8,650,377 B2 * | 2/2014 | Maniwa | G06F 3/061 711/165 |
| 8,972,694 B1 * | 3/2015 | Dolan | G06F 13/28 711/170 |

(Continued)

FOREIGN PATENT DOCUMENTS

| | | |
|---|---|---|
| JP | 9-297699 A | 11/1997 |
| JP | 2005-50007 A | 2/2005 |

(Continued)

*Primary Examiner* — Pierre-Michel Bataille
(74) *Attorney, Agent, or Firm* — Mattingly & Malur, PC

(57) ABSTRACT

A storage apparatus has a tiered pool including a plurality of storage tiers formed by a plurality of real page groups having different input/output performance and provides a virtual volume to which a storage area is allocated by a real page unit. At a time point before new data to be written to the virtual volume occurs based on a data object, if a real page is allocated to a write destination virtual page which is a write destination of the new data, a host computer transmits a change command to change the real page allocated to the write destination virtual page to a real page in a storage tier having predetermined performance to the storage apparatus. The storage apparatus changes the real page allocated to the write destination virtual page to a real page in the storage tier having the predetermined performance according to the change command.

18 Claims, 11 Drawing Sheets

(52) U.S. Cl.
CPC .......... *G06F 3/0665* (2013.01); *G06F 3/0685* (2013.01); *G06F 3/0689* (2013.01); *G06F 2003/0692* (2013.01)

(58) Field of Classification Search
USPC .................................................. 711/114, 170
See application file for complete search history.

(56) References Cited

U.S. PATENT DOCUMENTS

| | | | |
|---|---|---|---|
| 2006/0155950 | A1 | 7/2006 | Smith |
| 2009/0024810 | A1 | 1/2009 | Ito |
| 2011/0072225 | A1 | 3/2011 | Kawaguchi et al. |
| 2012/0144147 | A1 | 6/2012 | Inoue et al. |
| 2013/0036266 | A1* | 2/2013 | Naganuma .............. G06F 3/061 711/114 |
| 2013/0054920 | A1* | 2/2013 | Sato ...................... G06F 3/0605 711/165 |
| 2013/0080727 | A1* | 3/2013 | Naito ...................... G06F 3/061 711/165 |
| 2014/0372720 | A1* | 12/2014 | Miura .................. G06F 3/0611 711/165 |

FOREIGN PATENT DOCUMENTS

| | | | | |
|---|---|---|---|---|
| JP | 2009-43238 | A | 2/2009 | |
| JP | 2009-86838 | A | 4/2009 | |
| JP | 4391982 | B2 | 10/2009 | |
| JP | 2011-70628 | A | 4/2011 | |
| JP | 2011-227563 | A | 11/2011 | |
| JP | 2012-118945 | A | 6/2012 | |
| JP | 2012-243117 | A | 12/2012 | |
| JP | WO 2013018128 | A1 * | 2/2013 | ............. G06F 3/061 |
| JP | WO 2013183088 | A1 * | 12/2013 | ........... G06F 3/0607 |
| WO | 2012/164718 | A1 | 12/2012 | |
| WO | 2012/169027 | A1 | 12/2012 | |

* cited by examiner

| Data set name (124a) | User-specified storage tier (124b) | Used amount (MB) (124c) | Total capacity (MB) (124d) | Writing speed (KB/se-cond) (124e) | VVOL address (CCHH) (124f) | Page# (124g) | Storage tier (124h) | Reference value (MB) (124i) | Incremental value (MB) (124j) |
|---|---|---|---|---|---|---|---|---|---|
| AAAA.BBBB.CCCC | SSD | 10 | 150 | 100 | 1000-1009 | PAGE#1 | SSD | 5 | 50 |
| | | | | | 1010-1019 | PAGE#2 | SAS | | |
| | | | | | 1020-1029 | PAGE#3 | SAS | | |
| | | | | | 1030-1039 | — | — | | |
| DDDD.EEEE.FFFF | SAS | 5 | 30 | 50 | 1800-1809 | PAGE#4 | SATA | 5 | 38 |
| | | | | | 1810-1819 | PAGE#5 | SAS | | |
| ⋮ | ⋮ | ⋮ | ⋮ | ⋮ | ⋮ | ⋮ | ⋮ | ⋮ | ⋮ |

| Data set name (132a) | VVOL head address (CCHH) (132b) | Used amount (MB) (132c) | Total capacity (MB) (132d) |
|---|---|---|---|
| AAAA.BBBB.CCCC | 1000 | 10 | 150 |
| DDDD.EEEE.FFFF | 1800 | 5 | 30 |
| ⋮ | ⋮ | ⋮ | ⋮ |

Fig. 7

| Pool ID | VVOL apparatus number | Page# | VVOL address (CCHH) | Real address | Pool VOL storage tier | Exclusive /non-exclusive |
|---|---|---|---|---|---|---|
| POOL1 | PVOL11 | PAGE#1 | 1000–1009 | 10000–10009 | SSD | Non-exclusive |
| POOL1 | PVOL12 | PAGE#2 | 1010–1019 | 00010–00019 | SAS | Non-exclusive |
| POOL1 | - | - | - | 20020–20029 | SSD | Exclusive |
| POOL1 | PVOL13 | PAGE#4 | 1100–1119 | 20050–20069 | SATA | Non-exclusive |
| POOL1 | - | - | - | 30080–30089 | SSD | Exclusive |
| POOL2 | PVOL22 | PAGE#6 | 1800–1859 | 40100–40159 | SATA | Non-exclusive |
| ⋮ | ⋮ | ⋮ | ⋮ | ⋮ | ⋮ | ⋮ |

Data set name.... _____ 301a

Storage tier  301b

| Selection | Storage tier |
|---|---|
| ● | SSD |
| ○ | SAS |
| ○ | SATA |

Reference value: [____] MB  301c

Incremental value: [____] MB  301d

[Next data set configuration]  301e

| Destination | Command type | Parameter |
|---|---|---|

401a  401b  401c

COMPUTER SYSTEM, DATA MANAGEMENT METHOD, AND HOST COMPUTER

TECHNICAL FIELD

The present invention relates to a technique for managing data stored in a virtual volume to which real pages in a tiered pool including a plurality of real page groups having different input/output performance are allocated.

BACKGROUND ART

A technique is known in which in a computer system, a real page is allocated from a pool including a plurality of real storage areas (hereinafter referred to as "real pages") to a write destination virtual page in a virtual volume (a virtual logical volume) including a plurality of virtual storage areas (hereinafter "virtual pages") and write target data is written to the allocated real page. This technique is typically a kind of Thin Provisioning. A tiered pool is known as a kind of pool. The tiered pool is a storage area including a plurality of real page groups having different input/output performance (IO performance). Generally, one real page group is based on one or more storage devices having the same IO performance (or similar IO performance).

Hereinafter, each layer in the tiered pool is referred to as a "storage tier". The storage tier corresponds to a real page group. In other words, a plurality of real page groups having different IO performance correspond to a plurality of storage tiers respectively.

Changing a real page allocated to a virtual page, more specifically, migrating data of a target virtual page from a migration source real page allocated to the target virtual page to a migration destination real page in a storage tier different from a storage tier including the migration source real page and allocating the migration destination real page instead of the migration source real page to the target virtual page may be hereinafter referred to as "page migration". In the page migration, data is migrated by a page unit. Hereinafter, data of a page unit, which is migrated by the page migration, may be referred to as "page data". If it is not necessary to migrate the data of the migration source real page to the migration destination real page, the data need not be migrated in the page migration.

A data object is stored in such a virtual volume. Examples of the data object include "data set" which is a data object managed by a host computer of a main frame system and "file" which is a data object managed by a host computer of an open system.

Examples of technique related to data management in the tiered pool include techniques disclosed in Patent Literature 1 to Patent Literature 4.

CITATION LIST

Patent Literature

[PTL 1] JP 2012-118945
[PTL 2] JP 2009-43238
[PTL 3] JP 2011-70628
[PTL 4] JP 4391982

SUMMARY OF INVENTION

Technical Problem

When an amount of data written to a data set by a host computer increases, an amount of data written to a virtual volume increases, and thus, a larger number of real pages are allocated to the virtual volume. When use of the data set ends, the host computer deletes all the data (unnecessary data) in the data set. Here, even when the data in the data set is deleted, the real pages that store the data in the data set are still allocated to the virtual volume. Therefore, when data to be written to a new data set is written to the virtual volume, a real page may already be allocated to a write destination virtual page of the data to be written to the new data set. In this case, the data is written to the already allocated real page.

However, the already allocated real page is not necessarily a real page in a storage tier that satisfies performance required of the new data set. Therefore, the performance required of the data set may not be satisfied.

Similarly, in a computer system of an open system, a real page may already be allocated to a write destination virtual page of data of a file.

Here, for example, a real page on which preparation processing is performed can be released by performing predetermined preparation processing on the real page, such as by formatting the real page (for example, filling the real page with bit values "0"). However, even if the preparation processing is to be performed, the real page is already allocated to the virtual volume until the preparation processing is performed. Therefore, it is not possible to solve the problem that the performance required of the data set may not be satisfied.

Regarding the data set, control information is included in each predetermined size unit (for example, in each record unit) in the data set. The control information cannot be set to zero. Therefore, it is not necessarily possible to perform the preparation processing on the entire area of the real page (for example, it is not necessarily possible to fill the entire area of the real page with bit values "0"), so that the real page may not be released.

Regardless of the type of the data object, there may be no free real page in a storage tier having performance required of the data object. In this case, data of the data object is stored in a real page in a storage tier that does not have performance required of the data object.

Solution to Problem

A computer system includes a host computer and a storage apparatus. The host computer transmits a write command of data of a data object that specifies an address of a virtual volume which is a virtual logical volume including a plurality of virtual pages. The storage apparatus includes a tiered pool including a plurality of storage tiers formed by a plurality of real page groups having different input/output performance and allocates a real page from any one of the plurality of storage tiers to a virtual page in which the address specified by the write command is included.

At a time point before new data to be written to the virtual volume occurs based on a data object, if a real page is allocated to a write destination virtual page which is a write destination of the new data, the host computer transmits a change command to change the real page allocated to the write destination virtual page to a real page in a storage tier having predetermined performance to the storage apparatus. The storage apparatus receives the change command and changes the real page allocated to the write destination virtual page to a real page in the storage tier having the predetermined performance according to the change command.

Advantageous Effects of Invention

A probability that data of a data object is stored in a real page in a storage tier having appropriate performance increases. Thereby, it can be expected that performance required for access of a data object is realized.

BRIEF DESCRIPTION OF DRAWINGS

FIG. 3 is a configuration diagram of an example of a data set management table according to the embodiment.

FIG. 4 is a configuration diagram of an example of a data set information management table according to the embodiment.

FIG. 7 is a configuration diagram of an example of a real page management table according to the embodiment.

FIG. 8 is a diagram showing an example of a tier control information input screen according to the embodiment.

FIG. 9 is a diagram showing a configuration of a CCW (Channel Command Word) according to the embodiment.

DESCRIPTION OF EMBODIMENT

Hereinafter, an embodiment will be described. However, the embodiment described below does not limit the invention concerning the scope of the claims, and various elements described in the embodiment and all combinations of the elements do not necessarily indispensable for a solution of the invention.

Although various information may be described by an expression of "aaa table" in the description below, the various information may be represented by a data structure other than a table. Regarding the various information, the "aaa table" can be called "aaa information" in order to indicate that the information does not depend on the data structure.

Although processing may be described by using a "program" as the subject in the description below, the subject of the processing may be a processor because the program performs prescribed processing while appropriately using a storage resource (for example, memory) and/or a communication interface apparatus (for example, HBA, NIC, and port) by being executed by a processor (for example, CPU (Central Processing Unit)) included in a controller. The processing described by using the program as the subject may be processing performed by the controller. The controller may be the processor itself or may include a hardware circuit that performs part or all of the processing performed by the processor instead of or in addition to the processor. A computer program may be installed in a storage control apparatus from a program source. The program source may be, for example, a program distribution server or a computer-readable storage medium.

Figure 1:
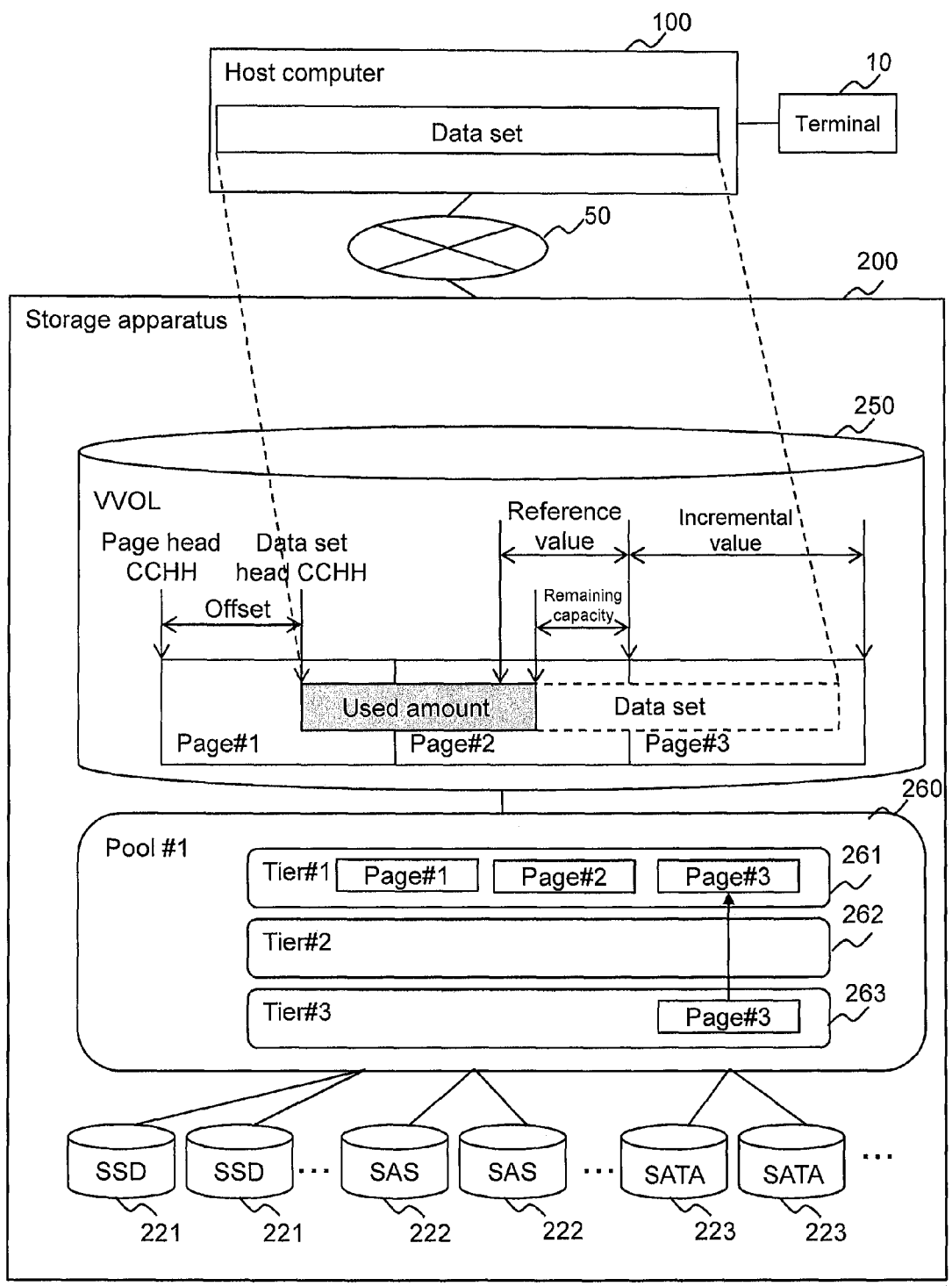
FIG. 1 is a diagram showing an outline of a computer system according to an embodiment.

FIG. 1 is a diagram showing an outline of a computer system according to the embodiment.

The computer system includes one or more terminals 10, one or more host computers 100, and one or more storage apparatuses 200. The terminal 10 and the host computer 100 are communicably coupled to each other. The host computer 100 and the storage apparatus 200 are coupled to each other through a communication network 50. The host computer 100 is, for example, a main frame and uses a data set in an application that performs a job.

The storage apparatus 200 includes a plurality of physical storage devices (PDEVs) ((SSD (Solid State Drive)) 221, PDEVs (SAS (Serial Attached SCSI)) 222, and PDEVs (SATA (Serial Advanced Technology Attachment)) 223) which have different input/output (IO) performance. The cause of the difference of the IO performance is at least either one of a difference between storage elements such as a semiconductor drive (for example, SSD) and a magnetic drive (for example, HDD: Hard Disk Drive) and a difference between interfaces such as FC (Fibre Channel) SAS and SATA. The PDEVs may be other than the PDEVs of the types described above. The PDEVs are not limited to the PDEVs in the storage apparatus 200, but may be PDEVs coupled to the outside of the storage apparatus 200. The PDEV in the storage apparatus 200 and the PDEV outside the storage apparatus 200 may have different IO characteristics for the host computer 100 even if the PDEVs are the same product.

The storage apparatus 200 manages a pool 260. The pool 260 includes a plurality of storage tiers (Tier) including storage areas of PDEVs having different IO performance. In the example shown in FIG. 1, the pool 260 includes three tiers: Tier 261 (Tier #1), Tier 262 (Tier #2), and Tier 263 (Tier #3). The Tier #1 includes storage areas of the PDEVs (SSD) 221. The Tier #2 includes storage areas of the PDEVs (SAS) 222. The Tier #3 includes storage areas of the PDEVs (SATA) 223. The input output performance of the Tier #1, the Tier #2, and the Tier #3 decreases in this order. The number of the Tiers is not limited to 3, but may be larger than 3 or less than 3. Each Tier includes a plurality of real pages. The real page is a storage area based on a PDEV that is a base of the Tier.

The storage apparatus 200 manages a VVOL 250 that can be accessed from the host computer 100. The VVOL 250 is a virtual logical volume (typically, a virtual logical volume according to the Thin Provisioning) having a capacity recognized by the host computer 100. A real page is allocated from the pool 260 to a virtual storage area (hereinafter referred to as a virtual page) of the VVOL 250. For example, when data is written to a free virtual page (a virtual page to which no real page is allocated) in the VVOL 250 in the storage apparatus 200 (for example, when the storage apparatus 200 receives a write command specifying an address belonging to a free virtual page from the host computer) the storage apparatus 200 allocates a free real page to the free virtual page. The write target data is written to the real page. The sizes of the real page and the virtual page may be the same or may be different from each other. The sizes of the real pages may be the same or may be different from each other (for example, may be different for each Tier).

In the example shown in FIG. 1, the data set of the host computer 100 is managed by the VVOL 250. The size of the data set and the page size of the real pages in the VVOL 250 are different from each other. Therefore, a plurality of virtual pages are required as a write destination of the data in the data set and thus a plurality of real pages may be required. In the VVOL 250, boundaries of the data set and boundaries of the pages do not necessarily correspond to each other, so that a state as shown in FIG. 1 may occur. Specifically, CCHH in the VOL 250 of the head of the data set (data set head CCHH) and CCHH of the head of the virtual pages corresponding to the head of the real pages (page head CCHH) do not correspond to each other. Here, the CCHH is an address in the virtual storage area in the VVOL 250. Hereinafter, a difference between the page head CCHH and the data set head CCHH is referred to as an offset.

For example, when a data set is created in the VVOL 250, as shown in FIG. 1, in the virtual storage area allocated to the data set in the VVOL 250, a real page in the Tier #1 in the pool 260 is allocated to the virtual page of Page #1, a real page in the Tier #1 in the pool 260 is allocated to the virtual page of Page #2, and a real page in the Tier #3 in the pool 260 is allocated to the virtual page of Page #3.

Here, if the performance of the Tier #1 is required for the data set, when a data access to the virtual page of Page #3 occurs, required performance cannot be obtained because the real page of Tier #3 is allocated to the virtual page of Page #3.

On the other hand, in the computer system according to the present embodiment, at a time point before the data to be written to the virtual page of Page #3 occurs, the virtual page of Page #3 is changed (migrated) from the currently allocated real page to a real page in a Tier (here, Tier #1) that can realize the required performance. Thereby, when data to be written to this virtual page occurs, it is possible to obtain the required performance.

The time point before the data to be written to the virtual page of Page #3 occurs is, for example, a time point when a remaining capacity of a currently used real page is compared with a predetermined reference value and the remaining capacity is less than the reference value. The reference value may be a value by which, before data is written to a virtual page to be used next time, it is assumed to be guaranteed that a real page in a Tier that can realize the required performance is allocated to the virtual page.

In the example of FIG. 1, an example is shown in which a real page is changed for one target virtual page. However, for example, real pages may be changed for a plurality of target virtual pages. For example, to determine the number of target virtual pages, information for determining the number of virtual pages, for example, a target amount of storage (incremental value) may be configured. The number of target virtual pages can be obtained by dividing the incremental value by the page size.

Figure 2:
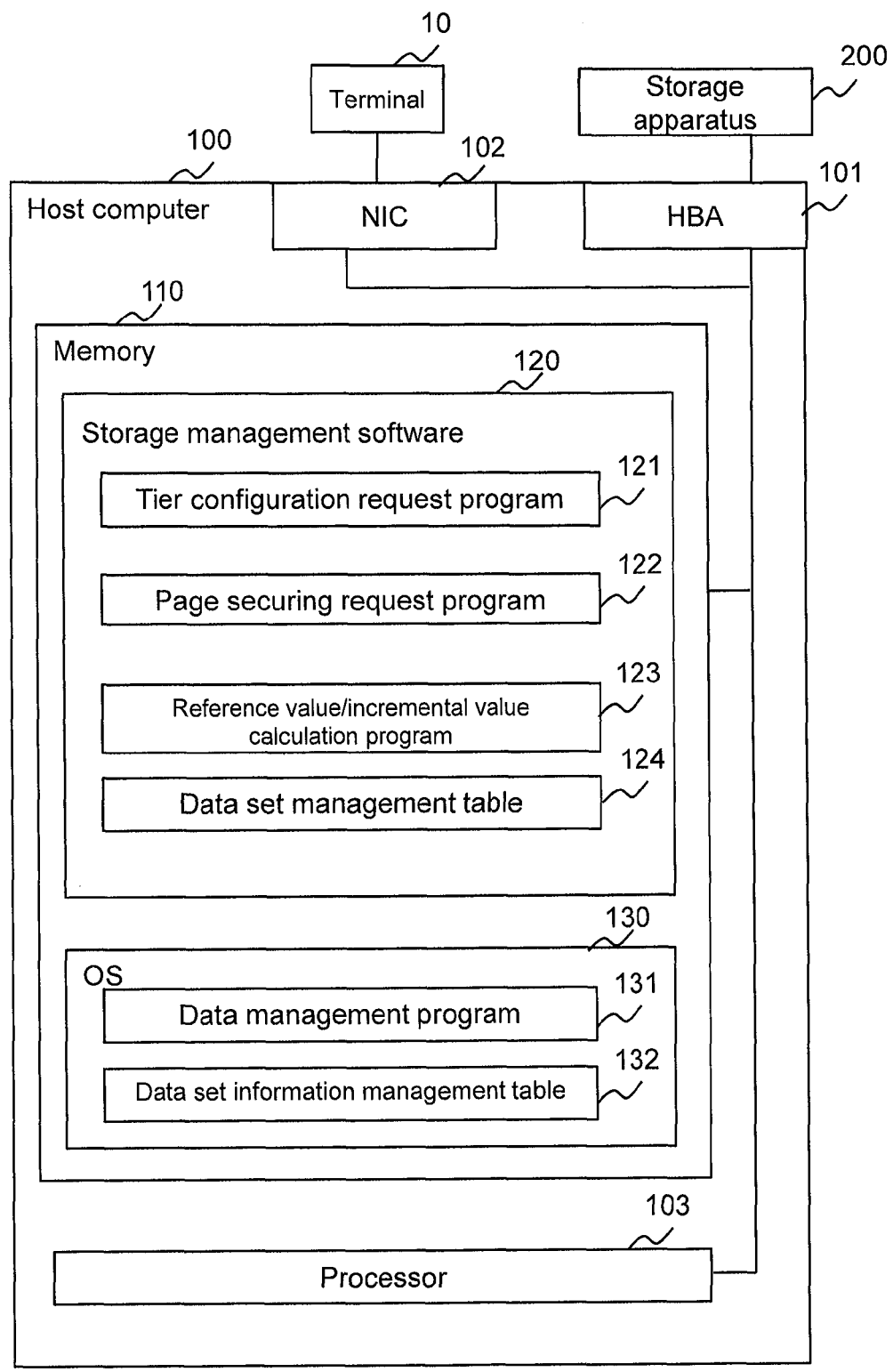
FIG. 2 is a diagram showing a configuration example of a host computer according to the embodiment.

FIG. 2 is a diagram showing a configuration example of the host computer according to the embodiment.

The host computer 100 includes an HBA (Host Bus Adapter) 101, a NIC (Network Interface Card) 102, a processor 103, and a memory 110.

The HBA 101 is a communication interface apparatus for communicating with the storage apparatus 200 through the communication network 50. The NIC 102 is a communication interface apparatus for communicating with the terminal 10. The processor 103 performs predetermined processing based on programs and various information stored in the memory 110. The terminal 10 is, for example, a client and the host computer 100 is, for example, a server.

The memory 110 stores the programs and various information used by the processor 103. The memory 110 stores, for example, storage management software 120 and OS 130.

The storage management software 120 includes a tier configuration request program 121, a page securing command processing program 122, a reference value/incremental value calculation program 123, and a data set management table 124.

Figure 10:
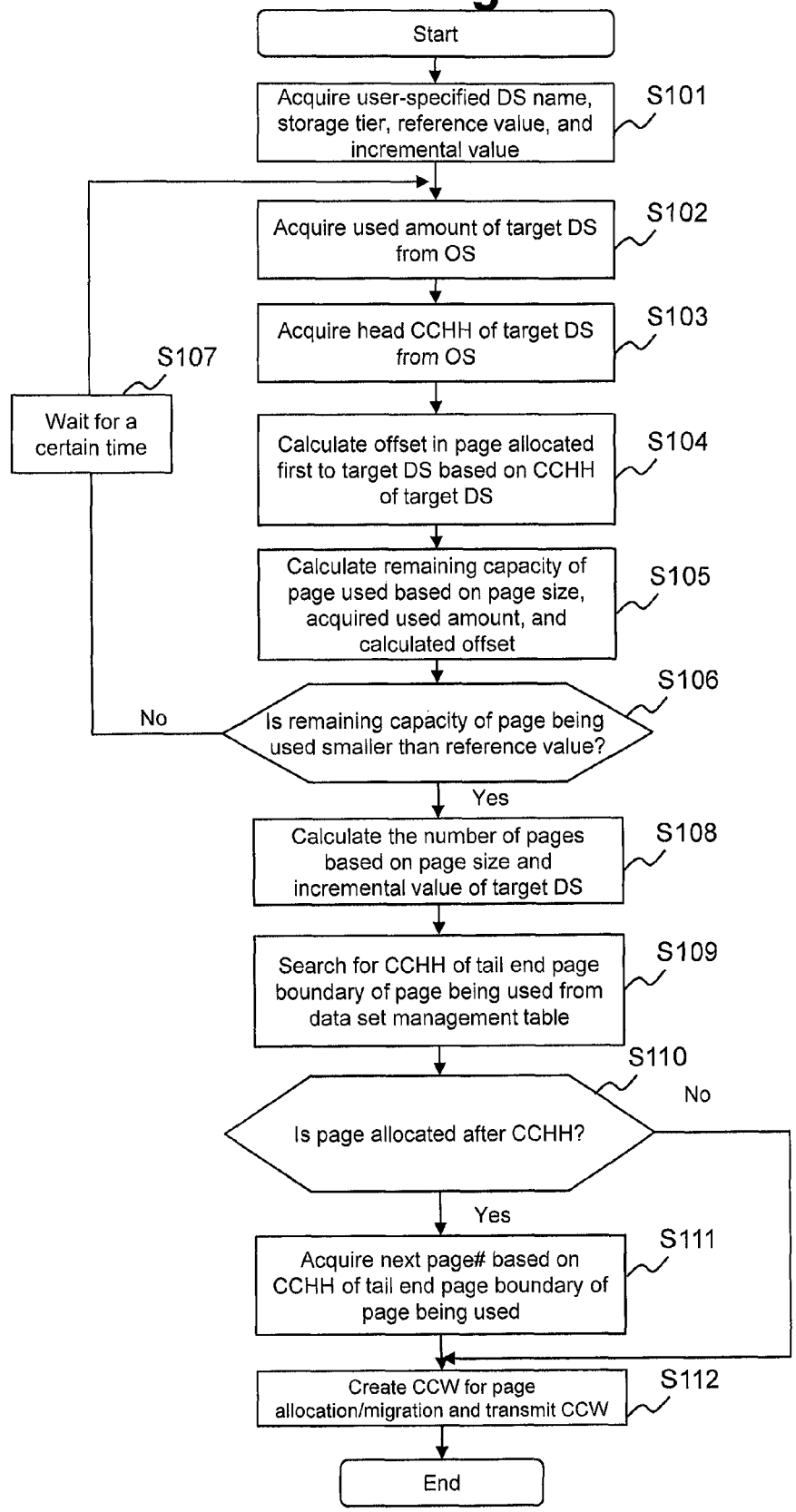
FIG. 10 is a flowchart of storage tier configuration request processing according to the embodiment.

The tier configuration request program 121 is a program for performing storage tier configuration request processing (see FIG. 10). The details of the processing performed by the tier configuration request program 121 will be described later. The page securing command processing program 122 is a program for performing higher storage tier page securing command processing (see FIG. 12). The details of the processing performed by the page securing command processing program 122 will be described later. The reference value/incremental value calculation program 123 is a program for performing reference value/incremental value calculation processing (see FIG. 14). The data set management table 124 is a table for managing data sets.

The OS 130 is a program for controlling the whole processing of the host computer 100 and includes a data management program 131 and a data set information management table 132. The data management program 131 is a program for performing management processing of the data set information management table 132 and transmitting and receiving data to and from the storage management software 120.

FIG. 3 is a configuration diagram of an example of the data set management table according to the embodiment.

The data set management table 124 is a table for managing data sets on which data management according to the embodiment is performed and stores entries including fields of a data set name 124a, a user-specified storage tier 124b, a used amount 124c, a total capacity 124d, a writing speed 124e, a VVOL address (CCHH) 124f, a page# 124g, a storage tier 124h, a reference value 124i, and an incremental value 124j.

In the data set name 124a, information (data set name) identifying a data set is stored. In the user-specified storage tier 124b, information (for example, type of PDEVs included in a Tier) identifying a storage tier specified by a user as a storage tier (Tier) that stores data of a data set corresponding to an entry is stored. In the used amount 124c, a capacity (used amount) used to store the data in the data set corresponding to the entry is stored.

In the total capacity 124d, a total capacity of the data set corresponding to the entry is stored. In the writing speed 124e, a data writing speed in the data set is stored. In the VVOL address (CCHH) 124f, a range of address (CCHH) on a VVOL in which the data set is arranged is stored. In the page# 124g, a page number (page#) allocated to a virtual page corresponding to addresses of the VVOL address (CCHH) 124f corresponding to the entry is stored. The page# is allocated when a real page is allocated to the virtual page. In the storage tier 124h, information (for example, type of PDEV included in a storage tier) identifying a storage tier of the real page allocated to the virtual page of the page# of the page# 124g is stored. Here, values to be configured in the VVOL address (CCHH) 124f, the page# 124g, and the storage tier 124h of each entry are acquired from the storage apparatus 200 by using CCW 401 shown in FIG. 9.

In the reference value 124i, a reference value indicating a reference capacity when preparing a real page (changing a real page or allocating a real page) corresponding to a virtual page to which following data in the data set is written is stored. When a free capacity (remaining capacity) of a real page to which data of the data set is being written becomes equal to or less than the reference value, it means that a real page of a virtual page to which the following data is to be written is required to be prepared. In the incremental value 124*j*, an incremental value indicating a capacity of real pages prepared at one time for the data set is stored. In the present embodiment, a storage area is allocated to the data set by page units, so that real pages, the number of which corresponds to equal to or larger than the capacity of the incremental value, are prepared when a new storage area is allocated.

FIG. 4 is a configuration diagram of an example of the data set information management table according to the embodiment.

The data set information management table 132 is a table for managing information of all data sets managed by the OS 130 and stores an entry including fields of a data set name 132*a*, a VVOL head address (CCHH) 132*b*, a used amount 132*c*, and a total capacity 132*d* for each data set.

In the data set name 132*a*, a data set name identifying a data set is stored. In the VVOL head address (CCHH) 132*b*, a head address on a VVOL of a data set corresponding to an entry is stored. In the used amount 132*c*, a capacity used in the data set corresponding to the entry is stored. In the total capacity 132*d*, a total capacity of the data set corresponding to the entry is stored. Information of the data set name 132*a*, the VVOL head address (CCHH) 132*b*, the used amount 132*c*, and the total capacity 132*d* is configured by the OS 130.

Figure 5:
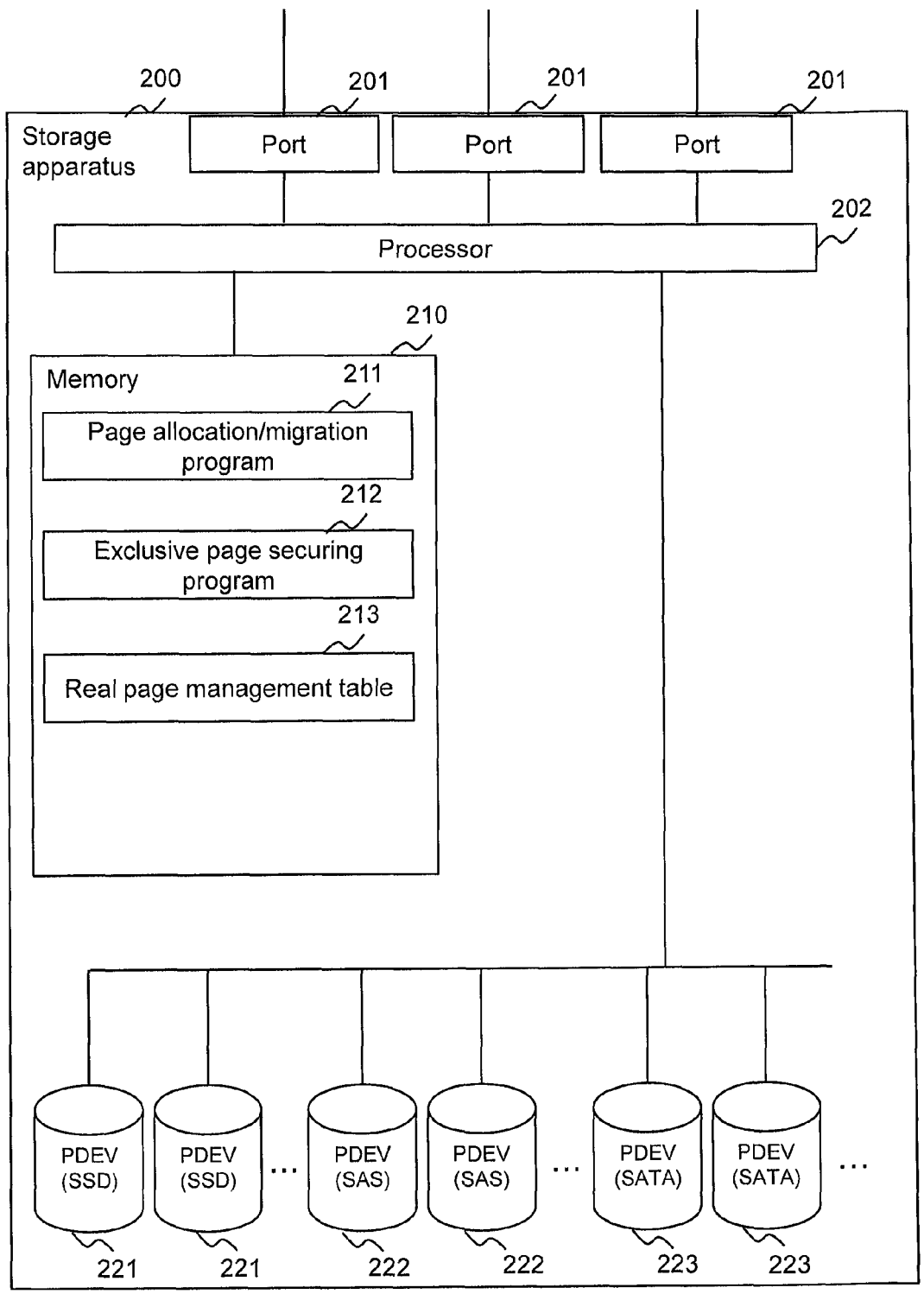
FIG. 5 is a diagram showing a configuration example of a storage apparatus according to the embodiment.

FIG. 5 is a diagram showing a configuration example of the storage apparatus according to the embodiment.

The storage apparatus 200 includes one or more ports 201, a processor 202, a memory 210, and a plurality of PDEVs (PDEVs (SSD) 221, PDEVs (SAS) 222, and PDEVs (SATA) 223).

The port 201 is an example of a communication interface apparatus and is an interface to couple with the communication network 50. The processor 202 performs various processes by using programs and data stored in the memory 210. The memory 210 stores a page allocation/migration program 211, an exclusive page securing program 212, and a real page management table 213.

Figure 11:
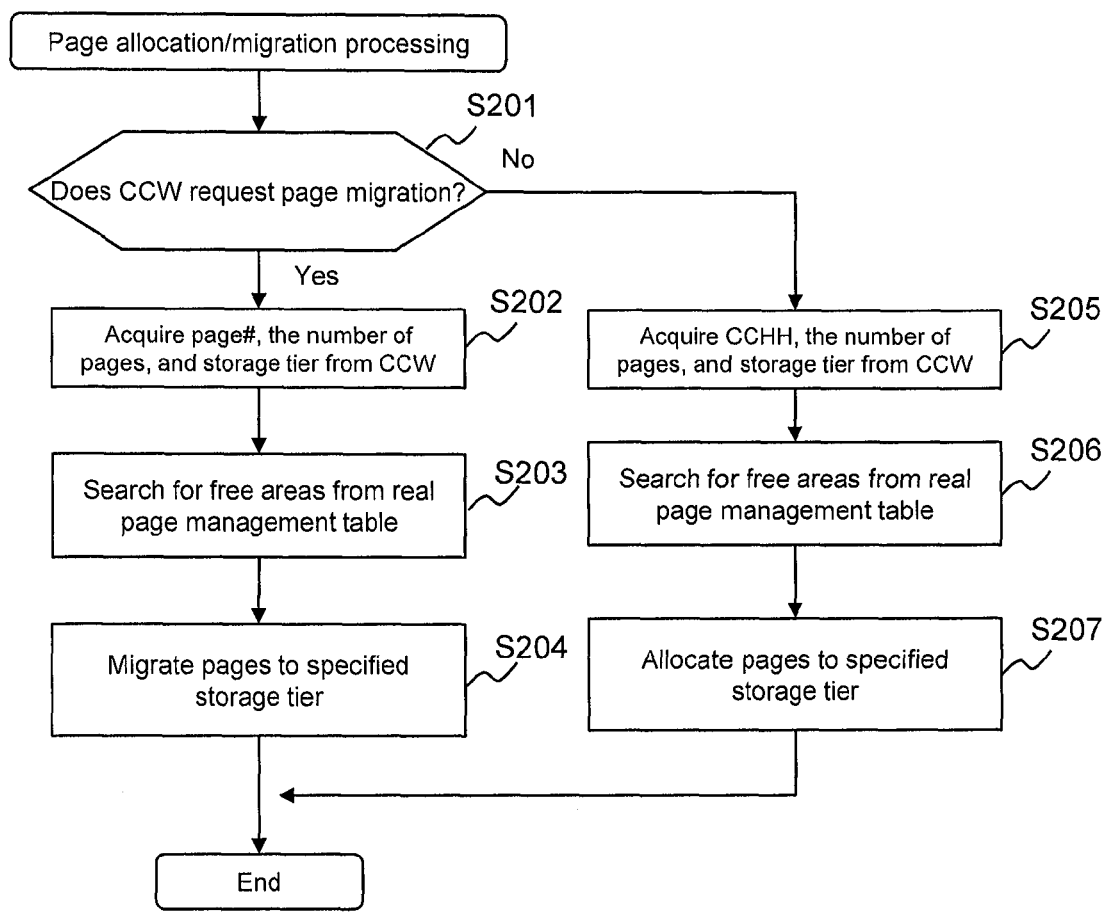
FIG. 11 is a flowchart of page allocation/migration processing according to the embodiment.

The page allocation/migration program 211 is a program for performing page allocation/migration processing (see FIG. 11). The details of the processing performed by the page allocation/migration program 211 will be described later. The exclusive page securing program 212 is a program for performing exclusive page securing processing (see FIG. 13). The details of the processing performed by the exclusive page securing program 212 will be described later.

Figure 6:
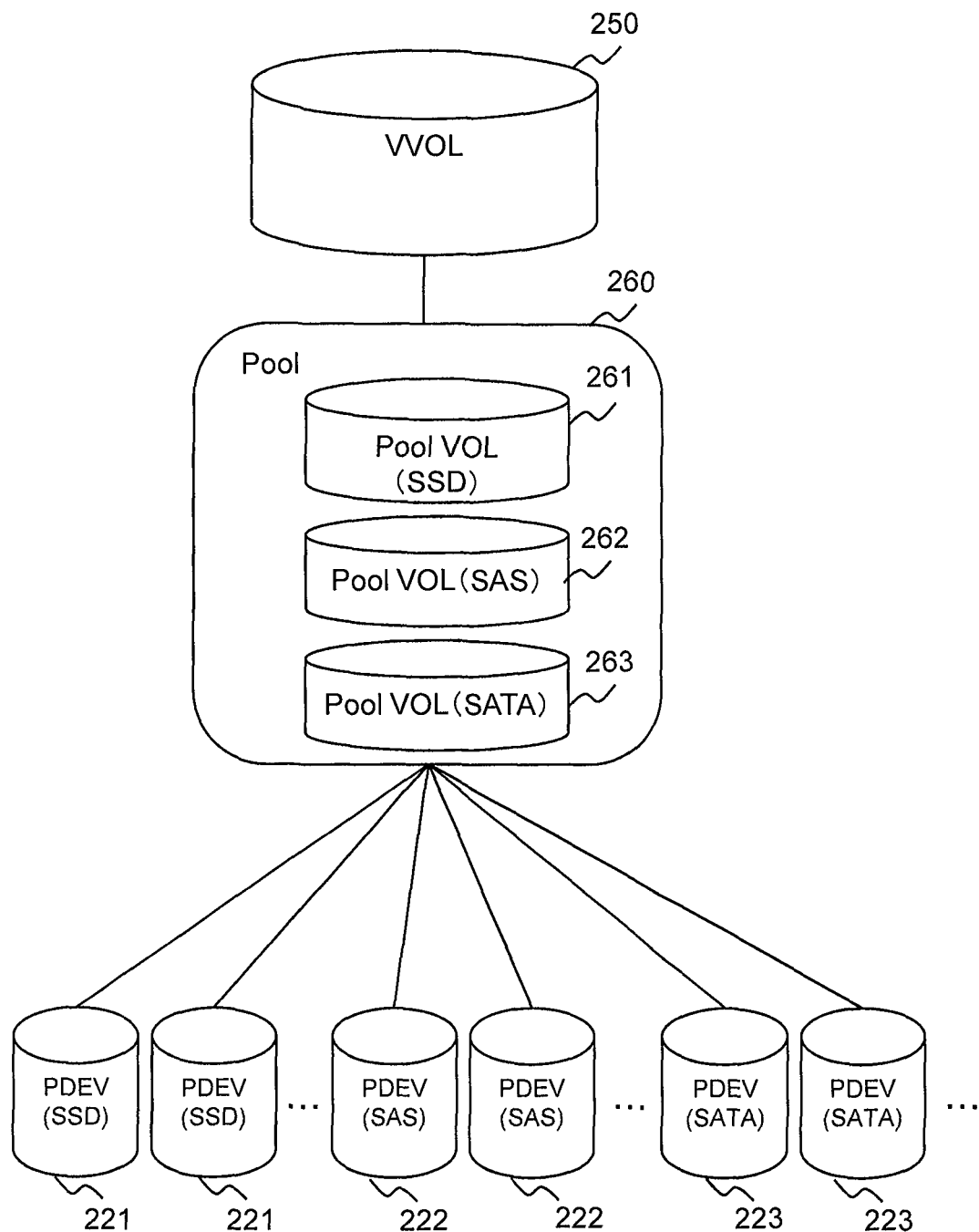
FIG. 6 is a diagram for explaining a logical configuration of a virtual volume and a pool according to the embodiment.

FIG. 6 is a diagram for explaining a logical configuration of a virtual volume and a pool according to the embodiment.

The storage apparatus 200 manages a pool 260. The pool 260 includes pool VOLs (261 to 263), which are logical volumes including storage areas of the PDEVs (PDEVs (SSD) 221, PDEVs (SAS) 222, and PDEVs (SATA) 223) having different characteristics. As the pool VOLs, there are a pool VOL (SSD) 261 including storage areas of the PDEVs (SSD) 221, a pool VOL (SAS) 262 including storage areas of the PDEVs (SAS) 222, and a pool VOL (SATA) 263 including storage areas of the PDEVs (SATA) 223. In the present embodiment, each pool VOL corresponds to a storage tier. In the present embodiment, the input output performance of the pool VOL (SSD) 261, the pool VOL (SAS) 262, and the pool VOL (SATA) 263 decreases in this order. In FIG. 6, one pool VOL is provided for each type of PDEV. However, a plurality of pool VOLs may be provided for each type of PDEV.

The storage apparatus 200 manages a VVOL 250 that can be accessed from the host computer 100. The VVOL 250 is a virtual logical volume (a virtual volume) having a capacity recognized by the host computer 100. A storage area is allocated to a virtual page of a virtual storage area in the VVOL 250 from any one of pool VOLs included in the pool 260 by a unit of real page.

FIG. 7 is a configuration diagram of an example of the real page management table according to the embodiment.

The real page management table 213 stores an entry including fields of a pool ID 213*a*, a VVOL apparatus number 213*b*, a page# 213*c*, a VVOL address (CCHH) 213*d*, a real address 213*e*, a pool VOL storage tier 213*f*, and exclusive/non-exclusive 213*g* for each real page (real page) managed in the pool 260.

In the pool ID 213*a*, information (pool ID) identifying a pool 260 that stores a real page (referred to as a corresponding real page in the description of the table) corresponding to the entry is stored. In the VVOL apparatus number 213*b*, an apparatus number of a VVOL to which the corresponding real page is allocated is stored. In the page# 213*c*, a page# of a virtual page to which the corresponding real page is allocated is stored. In the VVOL address (CCHH) 213*d*, an address range of the virtual page in a virtual volume to which the corresponding real page is allocated is stored. In the real address 213*e*, an address (real address) on a pool VOL of the corresponding real page is stored. In the pool VOL storage tier 213*f*, information identifying a storage tier of the pool VOL in which the corresponding real page is stored is stored. In the exclusive/non-exclusive 213*g*, information (exclusive or non-exclusive) indicating whether or not the corresponding real page is a real page secured for the storage management software 120 of the host computer 100 is stored. In the present embodiment, if the corresponding real page is a real page secured for the storage management software 120, "exclusive" is stored in the exclusive/non-exclusive 213*g*, and if the corresponding real page is not a real page secured for the storage management software 120, "non-exclusive" is stored in the exclusive/non-exclusive 213*g*. The storage apparatus 200 performs control so that a corresponding real page where "exclusive" is stored in the exclusive/non-exclusive 213*g* is not allocated to a virtual page unless required from the storage management software 120 of the host computer 100.

FIG. 8 is a diagram showing an example of a tier control information input screen according to the embodiment.

The tier control information input screen 301 is a screen displayed by the host computer 100 when the host computer 100 receives configuration of various information from a user of the terminal 10 and includes a data set name input area 301*a*, a storage tier configuration area 301*b*, a reference value configuration area 301*c*, an incremental value configuration area 301*d*, and a next data set configuration button 301*e*.

The data set name input area 301*a* is an area for inputting a data set name of a data set for which information is inputted (hereinafter referred to as a target data set in the description of FIG. 8). The storage tier configuration area 301*b* is an area for configuring a storage tier of a real page specified to be allocated to store data of the target data set. In the present embodiment, in the storage tier configuration area 301*b*, one storage tier can be selected from a plurality of storage tiers. The reference value configuration area 301*c* is an area for configuring a reference value related to a free capacity of a real page for preparing a real page for the target data set. The incremental value configuration area 301*d* is an area for configuring an incremental value (change page identification information) indicating a capacity to be prepared when a real page is prepared for the target data set. The next data set configuration button 301e is a button which is pressed to fix currently inputted information and input information for the next data set. A user can input various information into the tier control information input screen 301 by using an input apparatus not shown in the drawings of the terminal 10.

FIG. 9 is a diagram showing a configuration of a CCW (Channel Command Word) according to the embodiment.

The CCW 401 includes a destination 401a, a command type 401b, and a parameter 401c.

In the destination 401a, information identifying the storage apparatus 200 to which the CCW 401 is issued (transmitted) is stored. In the command type 401b, a type of command indicated by the CCW 401 is stored. In the parameter 401c, parameters required to execute the command are stored. A type and the number of parameters stored in the parameter 401c vary depending on the type of the command.

For example, when the host computer 100 issues an indication to change real pages allocated to virtual pages to the storage apparatus 200, that is, when issuing an indication of page migration, "page migration" that indicates the page migration is stored in the command type 401b of the CCW 401 and page# of virtual pages to be migrated, the number of virtual pages to be migrated, and a storage tier of real pages of a migration destination (that is, real pages to be newly allocated) are stored in the parameter 401c.

For example, when the host computer 100 acquires information to be configured in the VVOL address (CCHH) 124f, the page# 124g, and the storage tier 124h in the data set management table 124 for a certain data set from the storage apparatus 200, "information acquisition" is stored in the command type 410b of the CCW 401 and the VVOL head address (CCHH) of the corresponding data set and the used amount of the data set are stored in the parameter 401c. The VVOL head address (CCHH) and the used amount of the data set to be stored in the parameter 401c can be acquired from the data set information management table 130 by specifying the data set name in the OS 130. Processing for acquiring information to be configured in the VVOL address (CCHH) 124f, the page# 124g, and the storage tier 124h in the data set management table 124 is appropriately performed by the storage management software 120.

The CCW 401 in a case other than the case described above will be described along the description of processing described below.

Next, a processing operation of the computer system according to the embodiment will be described.

FIG. 10 is a flowchart of the storage tier configuration request processing according to the embodiment.

The storage tier configuration request processing is processing implemented by the tier configuration request program 121 in the host computer 100.

The tier configuration request program 121 acquires a DS name, a storage tier, a reference value, and an incremental value which are specified by a user (step S101). For example, the tier configuration request program 121 causes the terminal 10 to display the tier control information input screen 301 shown in FIG. 8 and acquires the information from the user. When performing a job including execution of an application that uses a data set, the user may configure the DS name, the storage tier, the reference value, and the incremental value in job control information (for example, information described in JCL (Job Control Language)) referred by the host computer 100 and the host computer 100 may acquire each piece of information from the job control information. The tier configuration request program 121 stores the acquired DS name, storage tier, reference value, and incremental value into fields corresponding to these in an entry in the data set management table 124.

Next, the tier configuration request program 121 acquires a used amount of a DS (hereinafter referred to as a target DS in the description of this flowchart) of the DS name specified by the user from the OS 130 (step S102). The OS 130 acquires the used amount of the target DS by referring to the data set information management table 132 by using the DS name of the target DS. The tier configuration request program 121 configures the used amount acquired from the OS 130 into the used amount 124c in the data set management table 124.

Next, the tier configuration request program 121 acquires a head address on the VVOL of the target DS (hereinafter referred to as a head CCHH) from the OS 130 (step S103). The OS 130 acquires the head CCHH of the target DS by referring to the data set information management table 132 by using the DS name of the target DS.

Next, the tier configuration request program 121 calculates an offset in a real page allocated first to the target DS based on the head CCHH of the target DS (step S104). Specifically, the tier configuration request program 121 acquires the head VVOL address of the page allocated first to the target DS from the data set management table 124 and calculates the offset by subtracting the acquired head VVOL address of the page allocated first from the head CCHH acquired from the OS 130.

Next, the tier configuration request program 121 calculates a remaining capacity of a page that is currently being used in the target DS based on the acquired used amount of the target DS and the calculated offset (step S105). Specifically, the tier configuration request program 121 calculates the remaining capacity of the page by the following formula (1):

$$\text{Remaining capacity of the page} = \text{page size} \times (\text{the number of pages used in the data set}) - (\text{offset} + \text{used amount}) \quad \text{Formula (1)}$$

Here, the number of pages used in the data set is the minimum integer equal to or larger than a number obtained by (offset+used amount)/page size.

Next, the tier configuration request program 121 determines whether or not the remaining capacity of the page that is currently being used in the target DS is less than the acquired reference value (step S106). By this determination, it is possible to appropriately determine whether or not a real page corresponding to the next virtual page needs to be prepared. As a result, if the remaining capacity of the page that is currently being used in the target DS is not less than the acquired reference value (step S106: No), it means that there is time until data will be written to the next page, so that the tier configuration request program 121 waits for a predetermined fixed time period (step S107) and then causes the process to proceed to step S102.

On the other hand, if the remaining capacity of the page that is currently being used in the target DS is less than the acquired reference value (step S106: Yes), it means that data will be written to the next page soon, so that the tier configuration request program 121 calculates the number of pages to be prepared based on the page size and the incremental value of the target DS (step S108). Specifically, the tier configuration request program 121 calculates the number of pages by dividing the incremental value of the target DS by the page size. The number of pages is the minimum integer equal to or larger than a value obtained by dividing the incremental value of the target DS by the page size. Real pages corresponding to the number of pages calculated in this way are prepared, so that real pages corresponding to an incremental amount is appropriately prepared.

Next, the tier configuration request program 121 acquires a boundary address of the end (the tail end) of the page that is being used from the data set management table 124 (step S109). Specifically, the tier configuration request program 121 acquires the boundary address by referring to the VVOL address (CCHH) 124f in an entry corresponding to the target data set and corresponding to the page that is being used in the data set management table 124.

Next, the tier configuration request program 121 determines whether or not a real page is allocated to a virtual page on and after the acquired boundary address (step S110). Here, whether or not a real page is allocated to a virtual storage area on and after the acquired boundary address can be determined by whether or not a page# is configured in the page# 124g in an entry corresponding to the next address of the boundary address in the data set management table 124.

As a result, if a real page is allocated to a virtual page on and after the acquired boundary address (step S110: Yes), the tier configuration request program 121 refers to the data set management table 124, acquires a page# allocated to the virtual page on and after the acquired boundary address (step S111), and causes the process to proceed to step S112. On the other hand, if a real page is not allocated to a virtual page on and after the acquired boundary address (step S110: No), the tier configuration request program 121 causes the process to proceed to step S112.

In step S112, if having performed step S111, the tier configuration request program 121 creates a CCW 401 (an example of a change command) to perform page migration and transmits the CCW 401 to the storage apparatus 200. On the other hand, if having not performed step S111, the tier configuration request program 121 creates a CCW 401 (an example of a page allocation command) to allocate new real pages to virtual pages and transmits the CCW 401 to the storage apparatus 200. Specifically, if having performed step S111, the tier configuration request program 121 configures "page migration" indicating the page migration in the command type 401b of the CCW 401 and configures the page# of page to be migrated, the number of pages calculated in step S108, and the storage tier in the user-specified storage tier 124b in an entry corresponding to the target DS in the data set management table 1124 in the parameter 401c.

On the other hand, if having not performed step S111, the tier configuration request program 121 configures "page allocation" indicating allocation of new pages in the command type 401b of the CCW 401 and configures the head CCHH of the virtual pages in the VVOL to which real pages are allocated, the number of pages calculated in step S108, and the storage tier in the user-specified storage tier 124b in an entry corresponding to the target DS in the data set management table 124 in the parameter 401c.

FIG. 11 is a flowchart of the page allocation/migration processing according to the embodiment.

The page allocation/migration processing is processing implemented by the page allocation/migration program 211 in the storage apparatus 200. The page allocation/migration processing is performed when the storage apparatus 200 receives the CCW 401 to perform page migration or the CCW 401 to allocate new real pages from the host computer 100.

The page allocation/migration program 211 determines whether or not the received CCW 401 requests a page migration (step S201). Whether or not the CCW 401 requests a page migration is known by checking whether the command type 401b of the CCW 401 is the "page migration" or the "page allocation".

As a result, if the CCW 401 requests a page migration (step S201: Yes), the page allocation/migration program 211 acquires the page#, the number of pages, and the storage tier from the parameter 401c of the CCW 401 (step S202) and acquires free real pages, the number of which corresponds to the acquired number of pages, from real pages corresponding to the acquired storage tier as real pages of migration destination (step S203). In the present embodiment, the page allocation/migration program 211 refers to the real page management table 213, and if there are entries of a page pool which corresponds to the acquired storage tier and is not allocated (page# is not configured in the page# 213) and where the exclusive/non-exclusive 213g is exclusive, the page allocation/migration program 211 preferentially determines real pages corresponding to the entries as migration destination real pages of virtual pages, the number of which corresponds to the acquired number of pages, on and after the acquired page#, that is, real pages which are newly associated with the virtual pages. Here, a real page where the exclusive/non-exclusive 213g is exclusive is managed so that the real page is allocated by only the page allocation/migration processing, so that it is possible to appropriately secure a real page in an appropriate storage tier to be able to be allocated.

Next, the page allocation/migration program 211 migrates virtual pages, the number of which corresponds to the acquired number of pages, on and after the acquired page# to the acquired real pages (step S204). Specifically, the page allocation/migration program 211 allocates the acquired real pages to virtual pages, the number of which corresponds to the acquired number of pages, on and after the acquired page#. In the page migration, data of the data set is not written to the migration source real pages, so that page data of the migration source real pages need not be migrated to the migration destination real pages. Thereby, it is possible to define one or more real pages allocated to a virtual storage area to which data may be written thereafter as real pages of a desired storage tier. Therefore, if data is written to the virtual storage area, it is possible to appropriately exhibit performance required for the data set.

On the other hand, if the CCW 401 does not request a page migration, that is, if the CCW 401 requests page allocation (step S201: No), the page allocation/migration program 211 acquires the CCHH, the number of pages, and the storage tier from the parameter 401c of the CCW 401 (step S205) and acquires free real pages, the number of which corresponds to the acquired number of pages, from real pages corresponding to the acquired storage tier as real pages of allocation destination (step S206). In the present embodiment, the page allocation/migration program 211 refers to the real page management table 213, and if there are entries of a real page which corresponds to the acquired storage tier and is not allocated and where the exclusive/non-exclusive 213g is exclusive, the page allocation/migration program 211 preferentially determines real pages corresponding to the entries as real pages to be newly allocated to virtual pages, the number of which corresponds to the acquired number of pages, on and after the acquired CCHH. Here, a real page corresponding to the entries where the exclusive/non-exclusive 213g is exclusive is managed so that the real page is allocated by only the page allocation/ migration processing, so that it is possible to appropriately secure a real page in an appropriate storage tier to be able to be allocated.

Next, the page allocation/migration program 211 allocates the acquired real pages to the virtual pages, the number of which corresponds to the acquired number of pages, on and after the acquired CCHH (step S207). Thereby, it is possible to allocate real pages of a desired storage tier to virtual pages to which data may be written thereafter. Therefore, if data is written to the virtual pages, it is possible to appropriately exhibit performance required for the data set.

Figure 12:
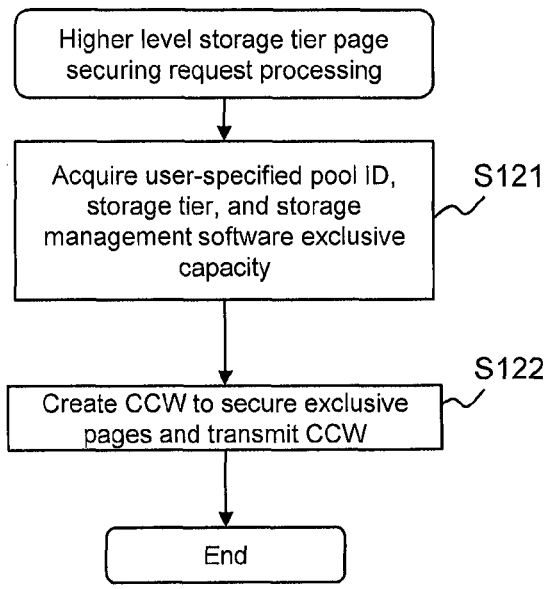
FIG. 12 is a flowchart of higher level storage tier page securing command processing according to the embodiment.

FIG. 12 is a flowchart of the higher level storage tier page securing command processing according to the embodiment.

The higher level storage tier page securing command processing is processing implemented by the page securing command program 122 in the host computer 100. For example, the higher level storage tier page securing command processing may be performed at a time point before the storage tier configuration request processing is performed or may be performed at the same time as the storage tier configuration request processing.

Next, the page securing command program 122 acquires a pool ID of a pool in which exclusive real pages are to be secured, a storage tier of the real pages to be secured, and a capacity of the real pages to be secured (exclusive capacity to be secured), which are specified by the user (step S121). For example, the page securing command program 122 causes the terminal 10 to display an input screen, receives specification of these pieces of information from the user through the input screen, and stores these pieces of information.

Next, the page securing command program 122 creates a CCW 401 to secure the exclusive real pages and transmits the CCW 401 to the storage apparatus 200 (step S122). Specifically, the page securing command program 122 configures "exclusive page securing" indicating securing exclusive real pages in the command type 401b of the CCW 401 and configures the acquired pool ID, storage tier, and exclusive capacity to be secured in the parameter 401c.

Figure 13:
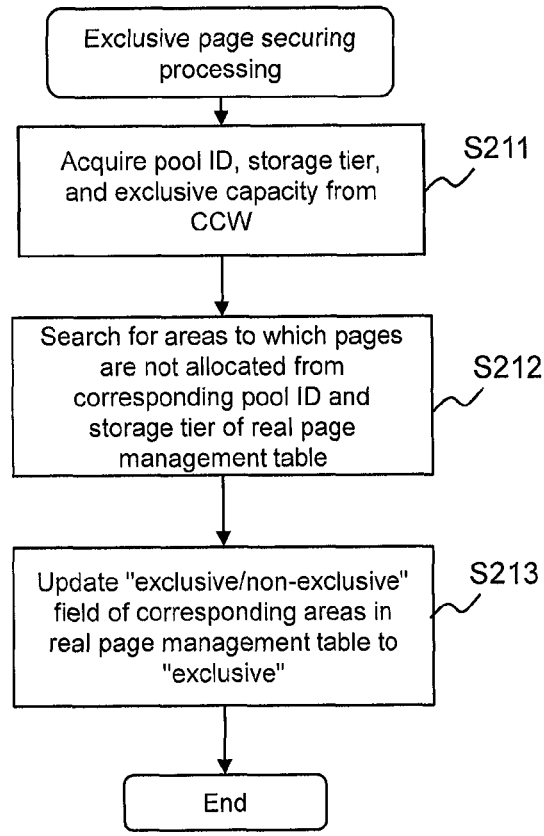
FIG. 13 is a flowchart of exclusive page securing processing according to the embodiment.

FIG. 13 is a flowchart of the exclusive page securing processing according to the embodiment.

The exclusive page securing processing is processing implemented by the exclusive page securing program 212 in the storage apparatus 200. The exclusive page securing processing is performed when a CCW 401 to secure exclusive pages is received from the host computer 100.

When the exclusive page securing program 212 receives the CCW 401 to secure exclusive pages, the exclusive page securing program 212 acquires the pool ID, the storage tier, and the exclusive capacity to be secured from the parameter 401c of the received CCW 401 (step S211) and searches for and acquires free real pages, the number of which corresponds to the number of pages corresponding to the exclusive capacity to be secured, from real pages corresponding to the acquired storage tier in the pool 260 corresponding to the acquired pool ID (step S212). In the present embodiment, the exclusive page securing program 212 refers to the real page management table 213 and searches for and acquires entries of a real page which corresponds to the acquired pool ID and the acquired storage tier and which is not allocated, the number of which corresponds to the number of real pages corresponding to the exclusive capacity to be secured.

Next, the exclusive page securing program 212 updates the exclusive/non-exclusive 213g of the secured entries to "exclusive" (step S213) and ends the processing. In this way, a real page corresponding to an entry where exclusive is configured in the exclusive/non-exclusive 213g is allocated to a virtual page by only the page allocation/migration processing. Therefore, a probability to be able to secure free real pages in an appropriate storage tier increases, so that it is possible to appropriately allocate real pages in the storage tier to virtual pages of the DS specified by the user.

Figure 14:
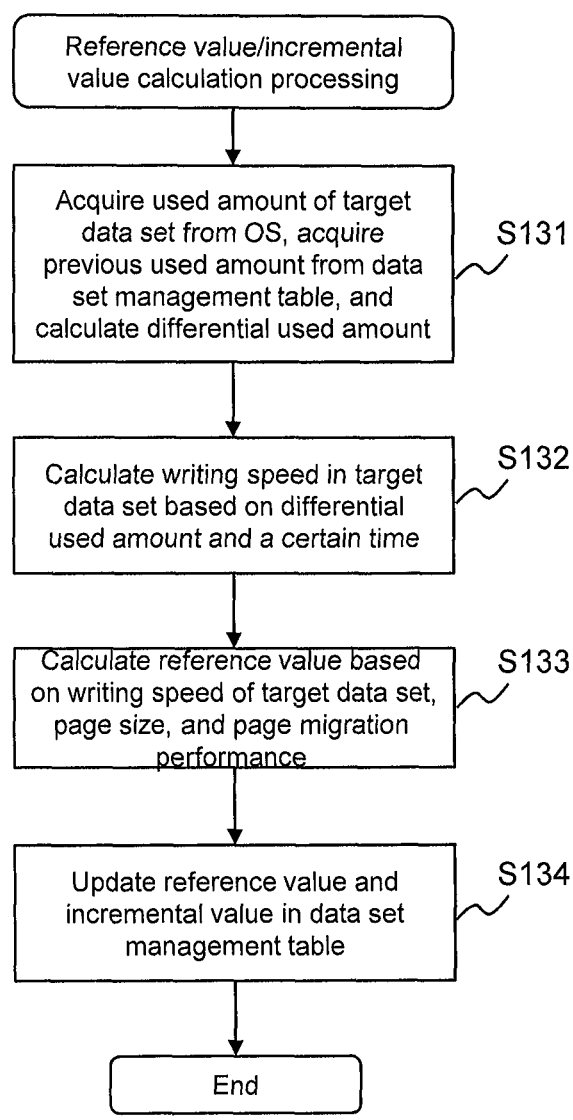
FIG. 14 is a flowchart of reference value/incremental value calculation processing according to the embodiment.

FIG. 14 is a flowchart of the reference value/incremental value calculation processing according to the embodiment.

The reference value/incremental value calculation processing is processing realized by the reference value/incremental value calculation program 123 in the host computer 100. The reference value/incremental value calculation processing is performed on each data set managed in the data set management table 124. For example, the reference value/incremental value calculation processing is performed every certain period of time (for example, every waiting time in step S107 in the storage tier configuration request processing). The reference value/incremental value calculation processing may not be performed when the reference value and the incremental value are configured by the user. When the reference value/incremental value calculation processing is performed, configuration of the reference value and the incremental value by the user may not be received.

The reference value/incremental value calculation program 123 acquires a used amount of a data set to be processed (hereinafter referred to as a target data set in the description of this flowchart) from the OS 130, acquires a used amount stored in the used amount 124c in the data set management table 124, that is, a used amount at a predetermined past time point (referred to as a previous used amount), and calculates a differential used amount, which is a difference between these used amounts (step S131).

Next, the reference value/incremental value calculation program 123 calculates a data writing speed in the target data set by dividing the differential used amount by a certain time (step S132). Here, the certain time may be the waiting time in step S107 in the storage tier configuration request processing. Or, the certain time may be a value that varies for each application on the basis of an attribute of the application that uses the target data set.

Next, the reference value/incremental value calculation program 123 determines the reference value based on the writing speed, the page size, and performance related to the page migration (page migration performance) in the storage apparatus 200 (step S133). Here, the page migration performance is, for example, a data migration speed when a page is migrated. For example, the reference value/incremental value calculation program 132 calculates the reference value by the following formula (2):

$$\text{Reference value} = \text{page size}/\text{page migration performance} \times \text{writing speed} \quad \text{Formula (2)}$$

The reference value is a value of the remaining capacity at which it is assumed that it is guaranteed to some extent that the remaining capacity of a virtual page that is currently being used is not exhausted until a page migration of a virtual page to which data will be written immediately after the current virtual page to which data of the data set is being written is completed. The formula to calculate the reference value is not limited to the aforementioned formula (2), but may be determined based on parameters related to characteristics of the storage apparatus 200 (for example, the page size and the page migration performance), parameters related to characteristics of an application (for example, a parameter indicating whether or not data writing speed is fast in the application), and the like.

Next, the reference value/incremental value calculation program 123 configures the calculated reference value in the reference value 124*i* in the data set management table 124, configures the page size in the incremental value 124*j* (step S134), and ends the reference value/incremental value calculation processing. In this way, the reference value is determined according to the actual data writing speed of the data set and the page migration performance, so that it is possible to appropriately determine timing to perform the page migration according to actual data writing in the data set.

While some embodiments of the present invention have been described, the present invention is not limited to these embodiments, and needless to say, the present invention can be variously modified without departing from the scope of the present invention.

For example, although a host computer, which is a main frame, is used as an example in the embodiment described above, a host computer of an open system may be used. In this case, data set may be replaced by file.

In the embodiment described above, real pages in a desired storage tier corresponding to a predetermined capacity are secured in order to allocate the real page to a data set and the secured real pages are allocated according to a situation. However, for example, real pages corresponding to a predetermined capacity are secured in advance and all the secured real pages may be allocated to a virtual volume.

REFERENCE SIGNS LIST

10 Terminal
100 Host computer
200 Storage apparatus

The invention claimed is:

1. A data management method in a computer system including a host computer configured to transmit a first write command of first data of a data object that specifies a first address of a virtual volume which is a virtual logical volume including a plurality of virtual pages and a storage apparatus configured to include a tiered storage area including a plurality of storage tiers formed by a plurality of real page groups having different input/output performance and where one or more first real pages from the real page groups of the plurality of storage tiers are allocated to one or more virtual pages of the virtual volume,
the data management method comprising:
before writing, by the host computer, the first data of the data object of the first write command to the virtual volume and when a first real page of the real pages is allocated to a first virtual page of the virtual pages corresponding to the address and a size of the data object specified by the first write command, transmitting, by the host computer, a change command to the storage apparatus to change a second real page of the real pages that is allocated to a second virtual page of the virtual pages of the virtual volume which logically follows the first virtual page to a third real page of the real page groups in the storage tiers having a predetermined higher input/out performance than the second real page;
receiving, by the storage apparatus, the change command;
changing, by the storage apparatus, the second real page allocated to the second virtual page to the third real page of the real page groups in the storage tiers having the predetermined higher input/output performance than the second real page according to the change command;
transmitting the first write command to the storage apparatus after transmitting the change command; and
writing the first data of the data object corresponding to the second virtual page in the third real page allocated to the second virtual page.

2. The data management method according to claim 1, further comprising:
before writing, by the host computer, second data of the data object of a second write command to the virtual volume and when a fourth real page is not allocated to a third virtual page of the virtual pages of the virtual volume corresponding to a second address specified by the second write command, transmitting, by the host computer, a page allocation command to the storage apparatus to allocate a fourth real page of the real page groups in the storage tiers having the predetermined higher input/output performance to the third virtual page;
receiving, by the storage apparatus, the page allocation command; and
allocating, by the storage apparatus, the fourth real page in the storage tiers having the predetermined higher input/output performance to the third virtual page according to the page allocation command;
transmitting, by the host computer, the second write command of the second data of the data object that specifies the second address of the virtual volume to the storage apparatus; and
writing, by the storage apparatus, the second data of the data object corresponding to the third virtual page in the fourth real page allocated to the third virtual page.

3. The data management method according to claim 1, further comprising:
detecting, by the host computer, whether a remaining capacity of the first real page allocated to the first virtual page is equal to or less than a predetermined reference value before writing the first data of the data object to the virtual volume, and
wherein the change command is transmitted when the remaining capacity of the first real page is equal to or less than the predetermined reference value.

4. A host computer comprising:
a communication interface device communicably coupled to a storage apparatus configured to include a tiered storage area including a plurality of storage tiers formed by a plurality of real page groups having different input/output performance and where one or more real pages from the real page groups of the plurality of storage tiers are allocated to one or more virtual pages of a virtual volume which is a virtual logical volume; and
a control device coupled to the communication interface device,
wherein the control device is configured to:
before writing first data of a data object to the virtual volume specified by a first write command and when a first real page of the real pages is allocated to a first virtual page of the virtual pages corresponding to an address and a size of the data object specified by the first write command, transmit a change command to the storage apparatus to change a second real page of the real pages that is allocated to a second virtual page of the virtual pages of the virtual volume which logically follows the first virtual page to a third real page of the real page groups in the storage tiers having a predetermined higher input/output performance than the second real page, transmit the first write command to the storage apparatus after transmitting the change command, and write the first data of the data object to the second real page which is allocated to the first virtual page.

5. The host computer according to claim 4, wherein the control device is configured to, before writing second data of the data object of a second write command to the virtual volume and when a fourth real page is not allocated to a third virtual page of the virtual pages of the virtual volume corresponding to a second address specified by the second write command, transmit a page allocation command to the storage apparatus to allocate a fourth real page of the real page groups in the storage tiers having the predetermined higher input/output performance to the third virtual page, wherein the control device is configured to transmit a second write command of second data of the data object that specifies a second address of the virtual volume to the storage apparatus, and wherein the control device is configured to write the second data of the data object corresponding to the third virtual page in the fourth real page allocated to the third virtual page in the storage apparatus.

6. The host computer according to claim 4, wherein the control device is configured to detect whether a remaining capacity of the first real page allocated to the first virtual page is equal to or less than a predetermined reference value before writing the first data of the data object to the virtual volume, and transmit the change command when the remaining capacity of the first real page is equal to or less than the predetermined reference value.

7. A computer system comprising:

a host computer configured to transmit a first write command of first data of a data object that specifies a first address of a virtual volume which is a virtual logical volume including a plurality of virtual pages; and a storage apparatus configured to include a tiered storage area including a plurality of storage tiers formed by a plurality of real page groups having different input/output performance and where one or more real pages from the real page groups of the plurality of storage tiers are allocated to one or more virtual pages of the virtual volume, wherein the host computer is configured to, before writing the first data of the data object of the first write command to the virtual volume and when a first real page of the real pages is allocated to a first virtual page of the virtual pages corresponding to the address and a size of the data object specified by the first write command, transmit a change command to the storage apparatus to change a second real page of the real pages that is allocated to a second virtual page of the virtual pages of the virtual volume which logically follows the first virtual page to a third real page of the real page groups in the storage tiers having a predetermined higher input/output performance than the second real page, wherein the storage apparatus is configured to receive the change command and change the second real page allocated to the second virtual page to the third real page of the real page groups in the storage tiers having the predetermined higher input/output performance than the second real page according to the change command, wherein the host computer is configured to transmit the first write command to the storage apparatus after transmitting the change command, and wherein the storage apparatus is configured to write the first data of the data object corresponding to the second virtual page in the third real page allocated to the second virtual page.

8. The computer system according to claim 7, wherein the host computer is configured to, before writing second data of the data object of a second write command to the virtual volume and when a fourth real page is not allocated to a third virtual page of the virtual pages of the virtual volume corresponding to a second address specified by the second write command, transmit a page allocation command to the storage apparatus to allocate a fourth real page of the real page groups in the storage tiers having the predetermined higher input/output performance to the third virtual page, wherein the storage apparatus is configured to receive the page allocation command and allocate the fourth real page in the storage tiers having the predetermined higher input/output performance to the third virtual page according to the page allocation command, wherein the host computer is configured to transmit the second write command of second data of the data object that specifies a second address of the virtual volume to the storage apparatus, and wherein the storage apparatus is configured to write the second data of the data object corresponding to the third virtual page in the fourth real page allocated to the third virtual page.

9. The computer system according to claim 8, wherein the host computer is configured to transmit a securing command to secure one or more real pages of the real page groups in the storage tier having the predetermined higher input/output performance to the storage apparatus, wherein the storage apparatus is configured to receive the securing command and secure the one or more real pages in the storage tiers according to the securing command, and wherein the storage apparatus is configured to preferentially allocate the secured one or more real pages to the third virtual page when receiving the page allocation request from the host computer.

10. The computer system according to claim 7, wherein the host computer is configured to detect whether a remaining capacity of the first real page allocated to the first virtual page is equal to or less than a predetermined reference value before writing the data of the data object to the virtual volume, and transmit the change command when the remaining capacity of the first real page is equal to or less than the predetermined reference value.

11. The computer system according to claim 10, wherein the predetermined reference value is specified by a user.

12. The computer system according to claim 10, wherein the host computer is configured to determine the predetermined reference value based on a rate of increase in a used amount of the data object.

13. The computer system according to claim 10, wherein the host computer is configured to determine the predetermined reference value based on a migration performance related to migration of real pages of the real page groups in the storage apparatus.

14. The computer system according to claim 7,
wherein the second one of the storage tiers having the predetermined higher input/output performance is specified by a user.

15. The computer system according to claim 7,
wherein the host computer is configured to transmit the change command, to the storage apparatus, when a predetermined number of real pages are change targets.

16. The computer system according to claim 15,
wherein the host computer is configured to receive target page identification information identifying the number of the real pages which are the change targets and determine the predetermined number based on the change page identification information.

17. The computer system according to claim 7,
wherein the host computer is configured to transmit a securing command to secure one or more real pages of the real page groups in the storage tiers having the predetermined higher input/output performance to the storage apparatus,
wherein the storage apparatus is configured to receive the securing command and secure the one or more real pages in the storage tiers according to the securing command, and
wherein the storage apparatus is configured to preferentially allocate the secured one or more real pages to the second virtual page when receiving the change command.

18. The computer system according to claim 7,
wherein the host computer is a mainframe, and
wherein the data object is a data set.

\* \* \* \* \*